(12) United States Patent
Rollwage et al.

(10) Patent No.: US 6,527,507 B2
(45) Date of Patent: Mar. 4, 2003

(54) FEEDING AGGREGATE FOR FUEL

(75) Inventors: Mathias Rollwage, Ditzingen (DE); Albert Gerhard, Tamm (DE); Jochen Rose, Hemmingen (DE); Erich Eiler, Sersheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/866,402

(22) Filed: May 25, 2001

(65) Prior Publication Data

US 2002/0001520 A1 Jan. 3, 2002

(30) Foreign Application Priority Data

May 27, 2000 (DE) .......................................... 100 26 490

(51) Int. Cl.⁷ ............................................... F01D 1/12
(52) U.S. Cl. ................................................... 415/55.1
(58) Field of Search ............................. 415/55.1, 55.2, 415/55.3, 55.4, 55.5, 55.6, 55.7, 106

(56) References Cited

U.S. PATENT DOCUMENTS 6,149,404 A * 11/2000 Dobler et al. ............... 417/356
6,220,826 B1 * 4/2001 Dolber et al. ............... 417/356
6,361,291 B1 * 3/2002 Dolber et al. ............... 417/356

FOREIGN PATENT DOCUMENTS

DE         197 25 941 A1      12/1998

* cited by examiner

Primary Examiner—Edward K. Look
Assistant Examiner—James M McAleenan
(74) Attorney, Agent, or Firm—Michael J. Striker

(57) ABSTRACT

A feeding aggregate for fuel has a feed pump which is formed as a side channel pump and has a housing, a pump chamber formed in the housing, and an impeller arranged in the pump chamber, an electric motor provided for driving of the impeller and having a stator and a rotor, with the rotor formed of one piece with the impeller, the feed pump having at least one pump stage, a rim of vanes having vane chambers therebetween and provided on at least one end side of the impeller, a partial ring-shaped side passage formed in the housing opposite to the rim of vanes and having an inlet and an outlet spaced from one another in a peripheral direction of the impeller and open into the side passage, the at least one pump stage of the feed pump having the rim of vanes only on one end side of the impeller and having the side passage in the housing opposite to the rim of vanes, the inlet and the outlet of the side passage being arranged at a same end side of the impeller, and the impeller at an end side which is opposite to the vanes being provided with recesses which are at least approximately mirror-symmetrical to the vane chambers and are connected through openings in the impeller with the vane chambers.

6 Claims, 3 Drawing Sheets

FEEDING AGGREGATE FOR FUEL

BACKGROUND OF THE INVENTION

The present invention relates to a feeding aggregate for fuel.

One of such aggregates is disclosed for example in the German patent document DE 197 25 941. These feeding aggregate has a feeding pump which is formed as a side channel pump. It is arranged in a pump chamber formed in a housing and has an impeller which is rotatably driven in the pump chamber. For driving of the pump, a brushless electric motor is provided which has a stator winding and a rotor with permanent magnets as well as a stator and a rotor which alternatingly receive the same. The impeller and the rotor are formed as a one part. The feeding pump has one stage, and the impeller at its both end sides is provided with a rim of vanes with intermediate vane chambers. Two ring-shaped feeding passages are formed in the housing opposite to the vane rim of the impeller. An inlet and an outlet which is offset from the inlet in a peripheral direction of the impeller open correspondingly into the feeding chambers. The vane chambers of the vane rim at the both end sides of the impeller are connected with one another so that during the operation of the feeding pump the fuel to be supplied flows through the impeller. Since the impeller and rotor are formed as one part, the impeller must have a thickness which is determined by the rotor in direction of its rotary axis. Thereby during the throughflow of the impeller, the circulation flow of the fuel to be supplied is substantially distorted.

SUMMARY OF THE INVENTION

Accordingly, it is an object of present invention to provide a feeding aggregate of the above mentioned general type, which avoids the disadvantages of the prior art.

In keeping with these objects and with others which will become apparent hereinafter, one feature of present invention resides, briefly stated, in a feeding aggregate which has a feed pump which is formed as a side channel pump and has a housing, a pump chamber formed in said housing, and an impeller arranged in said pump chamber; an electric motor provided for driving of said impeller and having a stator and a rotor, with said rotor formed of one piece with said impeller, said feed pump having at least one pump stage, a rim of vanes having vane chambers therebetween and provided on at least one end side of said impeller, a partial ring-shaped side passage formed in said housing opposite to said rim of vanes and having an inlet and an outlet spaced from one another in a peripheral direction of said impeller and open into said side passage, said at least one pump stage of said feed pump having said rim of vanes only on one end side of said impeller and having said side passage in said housing opposite to said rim of vanes, said inlet and said outlet of said side passage being arranged at a same end side of said impeller, and said impeller at an end side which is opposite to said vanes being provided with recesses which are at least approximately mirror-symmetrical to said vane chambers and are connected through openings in said impeller with said vane chambers.

In the inventive feeding aggregate the fuel does not flow through the impeller, since for each pump stage it has a rim of vanes only at its one end side, which is located opposite to a feeding passage. With recesses which are arranged on the end side of the impeller opposite to the vane rim, at least partially a compensation of axially oriented forces acting on the impeller during the pressure buildup in the feeding passage is obtained. In particular, each of these recesses is connected through the opening with the opposite vane chamber. A fuel feeding is performed on the end side of the impeller which is opposite to the vane rim.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
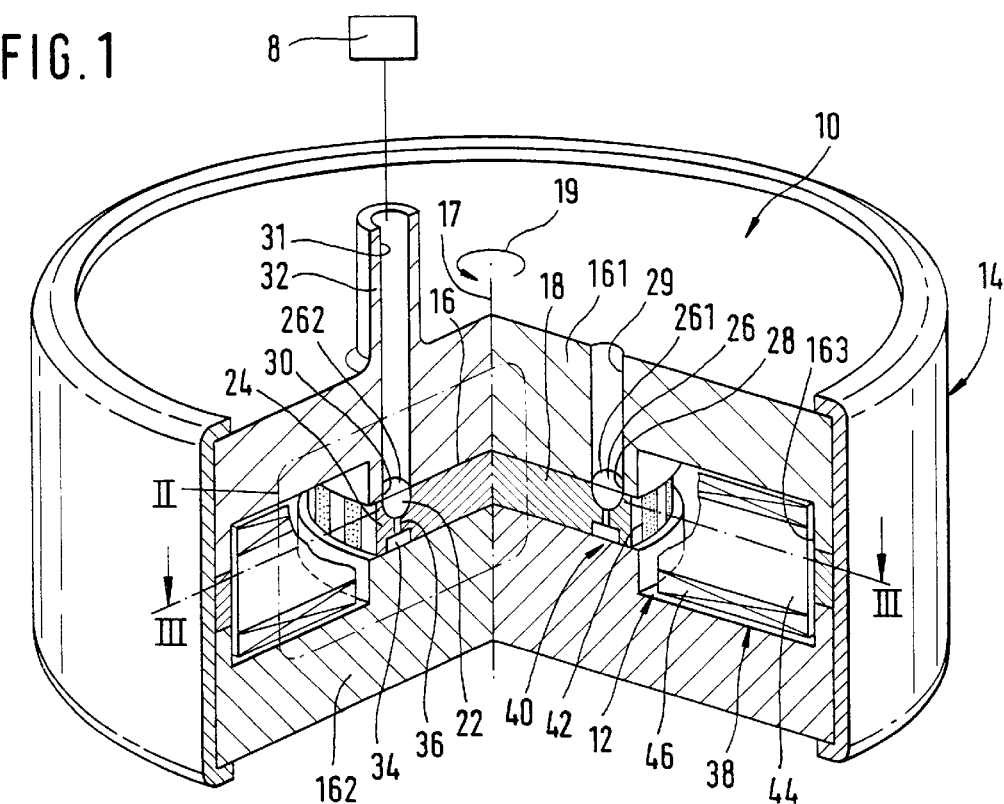
FIG. 1 is a view showing a feeding aggregate in a partial section in accordance with a first embodiment of the present invention.

A feeding aggregate shown in FIGS. 1–5 is used for feeding fuel from a supply container to an internal combustion engine of a motor vehicle. Conventionally, the feeding aggregate is arranged in connection with other components such as a storage cup, one or several filter elements, and in some cases other components, as a so-called tank unit in the fuel supply container or fuel tank of the motor vehicle.

The feeding aggregate has a feed pump 10 which is formed as a side channel pump, and an electric motor 12 which drives the feed pump 10. The feed pump 10 and the electric motor 12 are accommodated in a common housing 14. A pump chamber 16 is formed in the housing 14. It is limited in direction of the rotary axis of the feeding member of the feed pump 10 by two radially extending, axially spaced side walls 161, 162. In a peripheral direction it is limited by a peripheral wall 63 which connects the both side walls 161, 162 with one another along their circular periphery. An impeller 18 which forms a feeding member of the feed pump 10 is arranged in the pump chamber 16. It is supported on a shaft or an axle and is rotatably driven around a rotary axis 17. The rotary direction of the impeller 18 is identified with reference numeral 19.

Figure 2:
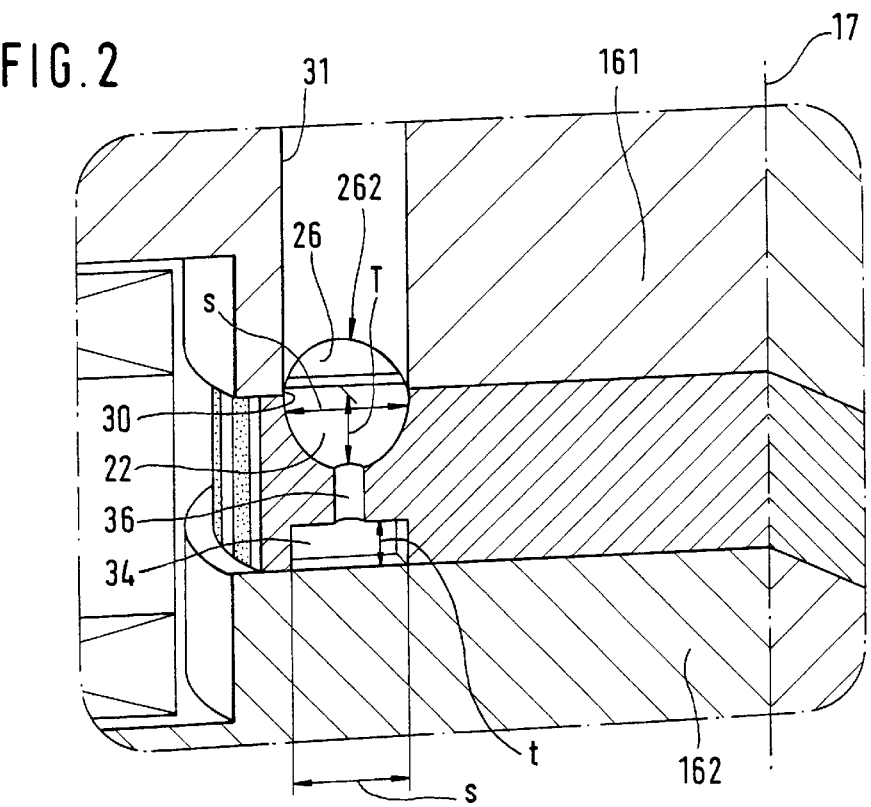
FIG. 2 is view showing a section of the inventive aggregate taken along the line II—II in FIG. 1 on an enlarged scale.
Figure 3:
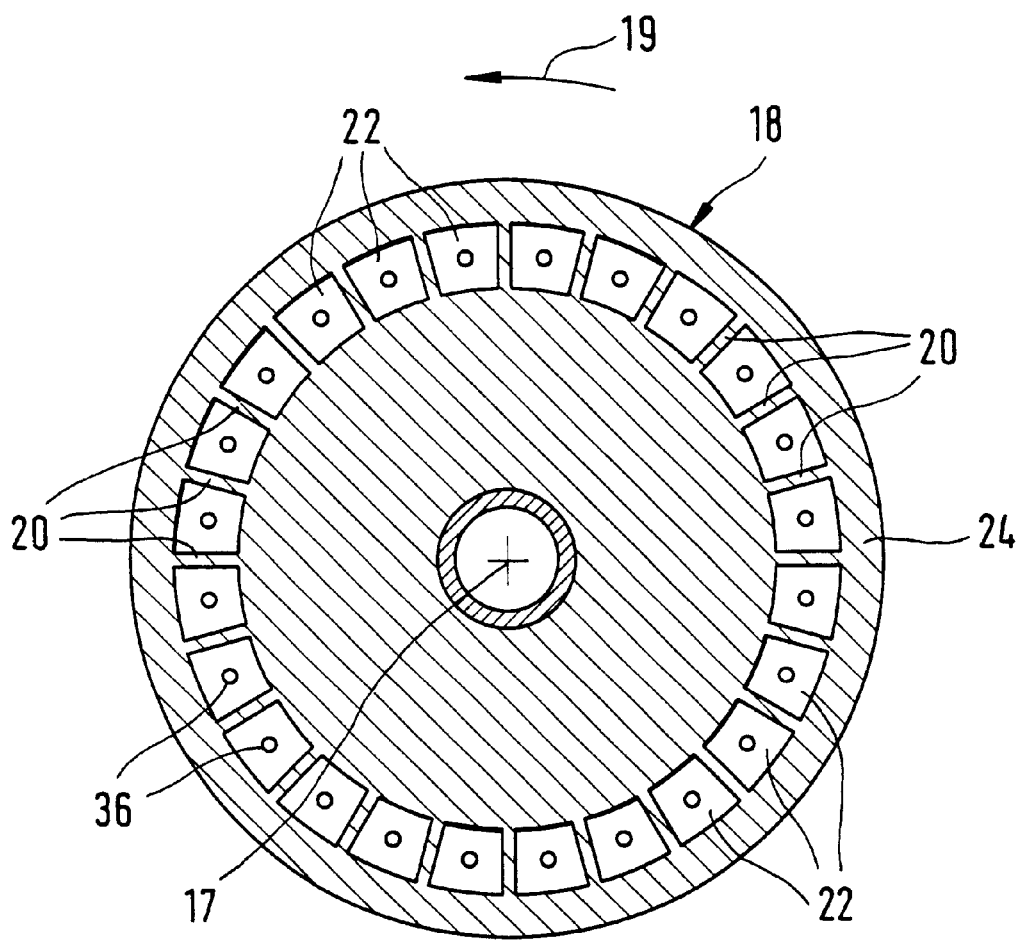
FIG. 3 is a view showing a feeding aggregate in a cross-section taken along the line III—III in FIG. 1.

FIGS. 1–3 show the feeding aggregate in accordance with a first embodiment of the invention. Here the feed pump 10 has only one pump stage. The impeller 18, as shown in FIG. 3, is provided at one end side with a rim of vanes 20 which are offset relative to one another in a peripheral direction and form vane chambers 22 therebetween. The vanes 20 can be arranged substantially radially or, when seen perpendicular to the rotary axis 17 of the impeller 18, can be inclined or curved and/or when seen in direction of the rotary axis 17, can lag with their radially outer ends relative to their radially inner ends in the peripheral direction 19 of the impeller 18.

The impeller vanes 20 are connected with one another by an outer ring 24. Each two neighboring vanes 20 of the impeller 18 limit a vane chamber 22 therebetween. Radially outwardly the vane chamber is limited by an outer ring 24 and is open in direction of the rotary axis 17 of the impeller, 18. The impeller 18 is located opposite to the side walls 161, 162 with a gap distance therebetween, and the outer ring 24 is arranged with a radial distance relative to the peripheral wall 163.

A groove-shaped side passage 26 which is open to the pump chamber 16 is formed in the side wall 161 of the pump chamber 16 located opposite to the end side of the impeller 18 with the rim of the vanes 20. The side passage 26 is at least approximately concentrical to the rotary axis of the impeller 18 and partially ring-shaped. The side passage 26 extends over a peripheral angle of for example approximately 330° from a side passage start to a side passage end. An interrupting web remains between the side passage end and the side passage start, to separate them from one another. In the side passage 26, its side passage start is identified with 261 and its side passage end is identified with 262. The side passage 26 has a cross-section, for example in the shape of a circular arc-portion. The vane chambers 22 between the vanes 20 of the impeller 18 can have a cross-section, for example in the shape of a circular arc-portion as well.

An inlet opening 28 opens in the region of the side passage start 261 and an outlet opening 30 opens in the region of the side passage end 262 of the passage 26. The inlet opening 28 and the outlet 30 are formed in the side wall 161. An inlet passage 29 and an outlet passage 31 are connected to them and extend for example substantially parallel to the rotary axis 17 of the impeller 18. The inlet opening 28 and the outlet opening 30 are arranged at the same end side of the impeller 18. A pipe 32 is connected to the inlet passage 29 and/or the outlet passage 31 on the side wall 161, in particular at its outer side which faces away from the impeller 18. A line can be connected to the pipe 32.

A plurality of recesses 34 which are spaced from one another in a peripheral direction are formed on the impeller 18, in particular at the end side of the impeller which is opposite to the rim of the vanes 20. They are at least approximately mirror-symmetrical relative to the vane rim. The recesses 34 in the radial direction relative to the rotary axis 17 of the impeller 18, have approximately the same extension s as the vane chambers 22. The depth t of the recesses 34 as seen in direction of the rotary axis 16, is smaller than the depth of the vane chambers 22 in direction of the rotary axis 16. The recesses 34 have a cross-section which is for example substantially rectangular. The recesses 34 are connected through openings 36, for example formed as boreholes, with the vane chambers 22 of the opposite end side of the impeller 18. The openings 36 have a substantially smaller cross-section than the openings 34. The side wall 162 which is opposite to the recesses 34 is smooth and has no side passage. The surface of the recesses 34, when seen in direction of the rotary axis 17, is at least approximately as large as the surface of the opposite vane chambers 22 when seen in direction of the rotary axis 17.

The electric motor 12 is formed as a so-called inner pole motor. In a known manner it has a stator 38 and a rotor 40 which is integrated in the impeller 18, so that the impeller 18 and the rotor 40 are formed as a one single part. The magnetic poles of the rotor 40 are formed by permanent magnet segments 42 which are mounted on the outer ring 24 of the impeller 18 over their periphery. The stator 38 is formed as a grooved plate pack 44 and arranged at least approximately coaxial to the rotary axis 17 of the impeller 18 and the housing 14, so that the inner ring surface of the plate pack 44 forms the peripheral wall 163 of the pump chamber 16. An armature winding 46 is arranged conventionally in the grooves of the plate pack 44. In the case of a direct current drive the electric motor 12 is electronically commutated. Since the impeller 18 is a component of the rotor 40, it is produced preferably of plasto-ferritic material.

During the operation of the feeding aggregate, the feed pump 10 is driven by the electric motor 12, and the impeller 18 rotates in the pump chamber 16. Through the inlet passage 29 and the outlet opening 28, fuel is aspirated into the side passage 26 and supplied by the rim of the vanes 20 on the impeller 18 in its peripheral direction 19 with increase of the pressure toward the end 262 of the side passage 26. The fuel exits through the outlet opening 30 and the outlet passage 31 at the end 262 of the side passage 26, and is supplied to the internal combustion engine. The recesses 34 in the impeller 18 are connected by the openings 36 at the end side of the impeller 18 opposite to the vanes 20, with the vane chambers 22. Therefore, there a pressure change in the peripheral direction of the impeller 18 is performed substantially in correspondence with the pressure build up in the vane chambers 22. Thereby the force which acts by the pressure build up on the impeller 18 in direction of its rotary axis 17 to the side wall 162 is at least partially compensated. Therefore substantially small or at least a low force is produced in direction of the rotary axis 17 with which the impeller 18 is pressed against the side wall 162. Supplied fuel does not flow through the impeller 18, and enters and exits at the same side of the impeller 18. A supply of fuel at the side of the impeller 18 which opposite to the vanes 20 is not performed with the recesses 34 since there is no side passage.

Figure 4:
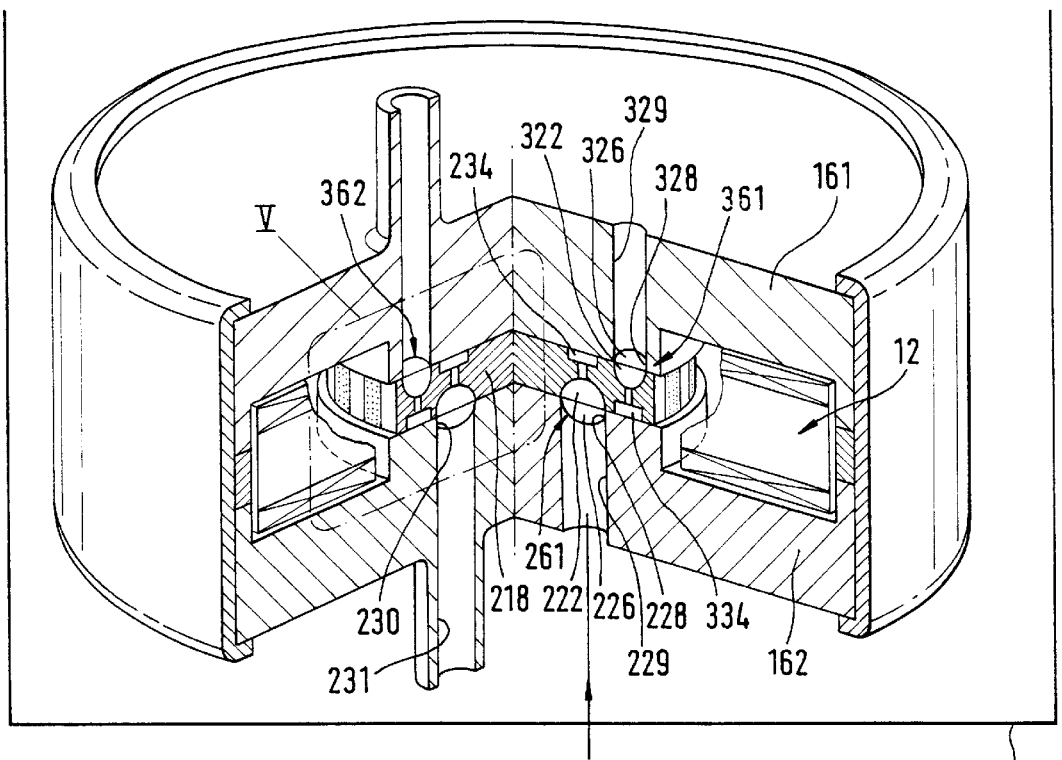
FIG. 4 is a view showing a feeding aggregate in accordance with a second embodiment of the present invention.
Figure 5:
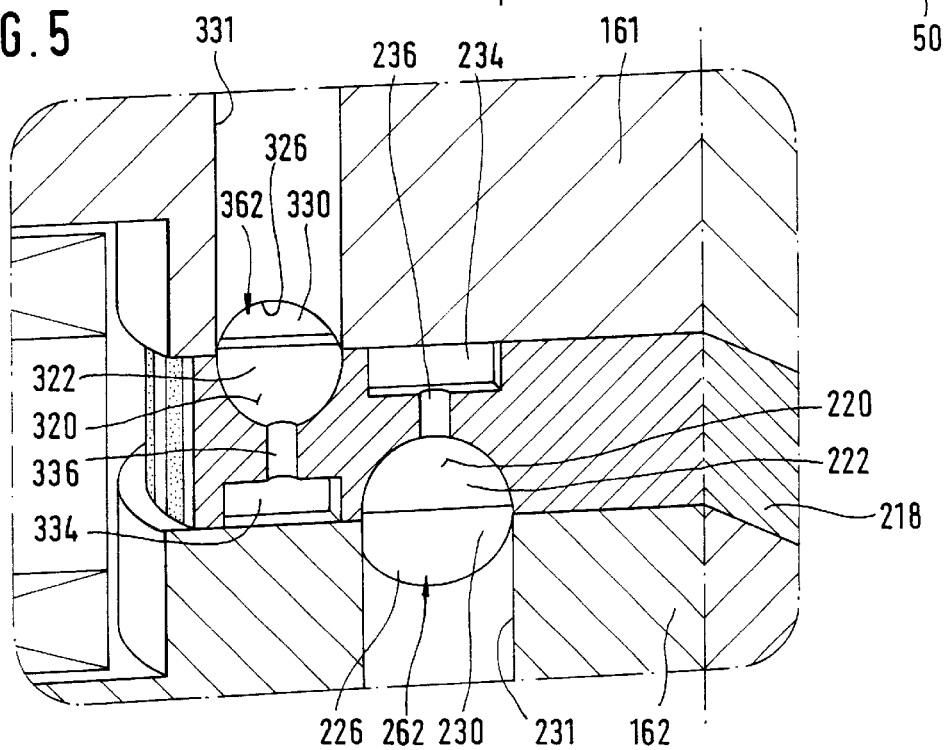
FIG. 5 is a view showing a fragment of the feeding aggregate of FIG. 4, which is identified as V on an enlarged scale.

FIGS. 4 and 5 show the feeding aggregate in accordance with a second embodiment of the present invention. Here the feed pump 10 has two pump stages. The impeller 218 has a rim of vanes 220, 320, for each pump stage at its end sides, with intermediately located vane chambers 222, 322. The vanes 220 of a first pump stage are arranged on a smaller radius on the impeller 218 than the vanes 320 of a second pump stage. The vanes 220 of the first pump stage are formed on an end side of an impeller 218, and the vanes 320 of the second pump stage are formed on the other end side of the impeller 218. It is possible also to provide a two-stage design of the feed pump 10 in which the vanes of both pump stages are formed on the same end side of the impeller 218.

Recesses 234 are formed at the opposite end side at least approximately mirror-symmetrically to the vane chambers 222 of the first pump side and are distributed over its periphery. They are connected by openings 236 with the vane chambers 222. Recesses 334 are formed on the opposite side of the impeller 218 at least approximately mirror-symmetrically to the vane chambers 322 of the second pump stage and are distributed over its periphery. They are connected through openings 336 with the vane chambers 322. A groove-like partial-ring shaped side passage 226 is formed in the side wall 162 opposite to the rim of the vanes 220 of the first pump stage. An inlet opening 228 opens into its passage start 261, and an outlet opening 230 opens into its passage end 262. The inlet opening 228 is connected with an inlet passage 229 extending in the side wall 162 and the outlet opening 230 is connected with an outlet passage 231 extending in the side wall 162. A groove-like partial ring-shaped side passage 326 is formed in the side wall 161 opposite to the rim of the vanes 320 of the second pump stage. An inlet opening 328 opens into its passage 261 and an outlet opening 330 opens into its passage end 362. The inlet opening 328 is connected with the inlet passage 322 which extends in the side wall 161, and an outlet opening 330 is connected with an outlet passage 331 extending in the side wall 161. The side passage starts 261, 361 and the side passage ends 262, 362 of the side passages 226, 326 can be arranged substantially in the same peripheral region or can be offset relative to one another in a peripheral direction, while the inlet and outlet openings are arranged correspondingly.

The forces which are produced due to the pressure build up in the side passages 226, 326 and act in direction of the rotary axis 17 of the impeller 218 are at least partially compensated by the recesses 234, 334 located opposite to the corresponding rims of vanes 220, 320 with the intermediately located vane chambers 222, 322 and their connections through the openings 236, 336. Therefore, at least approximately no resulting forces and moments act there. One rim of the vanes 220, 320 and one side passage 226, 326 in the opposite side wall 161, 162 is provided for each pump stage only on one end side.

The feeding aggregate in accordance with a second embodiment can be arranged for example in a storage container 50 located in a supply tank of the motor vehicle. The inlet passage 222 of the first pump stage opens into the supply tank, so that fuel is aspirated through it from the supply tank. The outlet passage 231 of the first pump stage opens into the storage container 50 so that the fuel which is feed from it is supplied into the storage container 50. The inlet passage 329 of the second pump stage opens into the storage container 50, so that fuel is also aspirated through it from the storage container 50. The outlet passage 331 of the second pump stage opens into a pipe 32, to which a line leading to the internal combustion engine 8 is connected. Therefore, fuel is supplied by the second pump stage from the supply container 50 to the internal combustion 8.

It will be understood that each of the elements described above, or two or more together, may also find a useful application in other types of constructions differing from the types described above.

While the invention has been illustrated and described as embodied in feeding aggregate for fuel, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by letters patent is set forth in the appended claims.

What is claimed is:

1. A feeding aggregate for fuel, comprising a feed pump which is formed as a side passage pump and has a housing, a pump chamber formed in said housing, and an impeller arranged in said pump chamber; an electric motor provided for driving of said impeller and having a stator and a rotor, with said rotor formed of one piece with said impeller, said feed pump having at least one pump stage, a rim of vanes having vane chambers therebetween and provided on one end side of said impeller, a partial ring-shaped side passage formed in said housing opposite to said rim of vanes and having an inlet and an outlet spaced from one another in a peripheral direction of said impeller and open into said side passage, said at least one pump stage of said feed pump having only one said side passage in said housing, said inlet and said outlet of said side passage being arranged at the same end side of said impeller, and said impeller at an end side which is opposite to said vanes being provided with recesses which are at least approximately mirror-symmetrical to said vane chambers and are connected through openings in said impeller with said vane chambers.

2. A feeding aggregate as defined in claim 1, wherein said feed pump also has a second stage provided with a rim of vanes with vane chambers therebetween and with a side passage and said recesses communicating through openings with said vane chambers, said rims of vanes with said vane chambers for said pump stages being offset relative to one another in a radial direction relative to a rotary axis of said impeller, said side passages being formed in said housing opposite to said rims of vanes, said recesses being formed at least approximately mirror-symmetrically to said vane chambers of both said rims of said vanes at the opposite end sides of the impeller and communicate with said vane chambers through said openings in said impeller.

3. A feeding aggregate as defined in claim 2, wherein said rims of said vanes with said vane chamber for said both pump stages are formed at opposite end sides of said impeller.

4. A feeding aggregate as defined in claim 1, wherein said recesses extend in a radial direction relative to a rotary axis of said impeller at least approximately equally to an extension of said vane chambers in said direction.

5. A feeding aggregate as defined in claim 1, wherein said recesses have a depth in direction of a rotary axis of said impeller which is smaller than a depth of said vane chambers in said direction.

6. A feeding aggregate as defined in claim 1, wherein said recesses have an area as considered in direction of rotary axis of said impeller which is at least approximately equal to an area of said vane chambers as considered in said direction of said rotary axis.

\* \* \* \* \*